US005690718A

United States Patent [19]
Sabin

[11] Patent Number: 5,690,718
[45] Date of Patent: Nov. 25, 1997

[54] BATTERY PASTE RECYCLING PROCESS

[75] Inventor: Cullen M. Sabin, San Diego, Calif.

[73] Assignee: Global Aener/Cology Corp., Westlake Village, Calif.

[21] Appl. No.: 539,993

[22] Filed: Oct. 6, 1995

[51] Int. Cl.$^6$ ............................ C22B 3/04; C01G 21/14
[52] U.S. Cl. ........................ 75/711; 75/743; 209/172.5; 209/175; 423/434
[58] Field of Search ............................ 209/172.5, 174, 209/175, 176; 75/711, 743; 423/92, 433, 619, 434

[56] References Cited

U.S. PATENT DOCUMENTS

| | | |
|---|---|---|
| 2,146,294 | 2/1939 | Hayward . |
| 3,689,253 | 9/1972 | Dorenfeld et al. . |
| 3,883,348 | 5/1975 | Acoveno et al. . |
| 3,892,563 | 7/1975 | La Point . |
| 4,024,055 | 5/1977 | Blann . |
| 4,026,477 | 5/1977 | Tremolada ............... 209/172.5 |
| 4,211,557 | 7/1980 | Sychev et al. . |
| 4,220,628 | 9/1980 | Striffler, Jr. et al. . |
| 4,269,810 | 5/1981 | Kolakowski . |
| 4,273,746 | 6/1981 | Kolakowski . |
| 4,336,236 | 6/1982 | Kolakowski et al. . |
| 4,460,442 | 7/1984 | Ducati . |
| 4,769,116 | 9/1988 | Olper et al. . |
| 4,871,428 | 10/1989 | Misra et al. . |
| 5,248,342 | 9/1993 | Montgomery et al. ............... 75/715 |

OTHER PUBLICATIONS

N. A. Lange, *Handbook of Chemistry*, 3rd Ed., pp. 156–159, Handbook Publishers, Inc., 1939.

A. F. Taggart, *Handbook of Mineral Dressing, Ores and Industrial Minerals*, Chp. 8, "Wet Classification" pp. 8–02 and 8–03, John Wiley & Sons, Inc., 1945.

A. F. Taggart, *Elements of Ore Dressing*, Chp. 5, "Introduction to Sedimentation" pp. 69–71, John Wiley & Sons, Inc., 1951.

B. A. Wills, *Mineral Processing Technology*, 5th Ed., Chp. 9, "Classification", pp. 363–369, Pergamon Press, 1992.

*Primary Examiner*—Melvyn Andrews
*Attorney, Agent, or Firm*—Knobbe, Martens, Olson & Bear

[57] ABSTRACT

A method of recovering fine lead-containing particles (battery paste) from expended lead-acid batteries in a form which can be used as battery paste in the manufacturing of new batteries without smelting is disclosed. A method of heating lead carbonate particles to about 315° C. to convert them to lead monoxide particles for use in battery manufacturing is also disclosed.

21 Claims, 3 Drawing Sheets

BATTERY PASTE RECYCLING PROCESS

BACKGROUND OF THE INVENTION

According to a 1994 study by the Battery Council International, 96.8% of the lead content of batteries sold in the United States in 1992 was recycled. Because of the time lag between the production of a battery and the appearance of its lead content on the scrap market, this percentage was based on the relationship between the lead flowing into manufacturing and the lead recovered in the scrap market during that year. Thus, recycling of lead represents a major component of the battery manufacturing industry. Because of the continuous loop between manufacturer, consumer, and recycler, an improvement in lead recycling processes will benefit all parts of the loop in the long run.

During battery manufacturing, metallic lead is acquired by the battery manufacturer and apportioned appropriately to make metallic support components (grids, posts, etc.) and lead monoxide powder. A paste of lead monoxide powder is spread onto metal supporting grids to form plates and then cured to bond the powder into a solid but porous mass. The lead monoxide particles in the cured plates are electrochemically converted into both metallic lead and lead dioxide using processes such as those described in U.S. Pat. No. 4,871,428.

During battery recycling, a battery "breaker" dismantles expended batteries and separates the components into four streams: acid, plastic, lead-containing materials and non-recyclables. The lead-containing materials consist of a mixture of metallic lead, lead dioxide, and lead sulfate, the latter two accounting for about 40% of the recovered lead. One method of breaking lead-acid batteries and separating the constituents is disclosed in U.S. Pat. No. 3,892,563 in which sodium carbonate is added directly to the breaking device so that the lead sulfate constituents are converted to lead carbonate and the acid is neutralized during the separation process.

The lead-containing components must be reprocessed before they can be manufactured into new batteries. Typically, the lead compounds and metallic lead components are smelted together to produce lead metal. The lead sulfates are usually desulfated before smelting to limit subsequent "scrubbing" of the smelter emissions.

A number of methods are currently known for desulfating the lead sulfate in battery mud including those described in U.S. Pat. Nos. 2,146,294, 3,689,253, 3,883,348, 4,269,810 and 4,273,746. It is also advantageous to remove chlorine-containing organic substances prior to smelting to avoid formation of lead chlorides during smelting such as disclosed in U.S. Pat. No. 4,211,557. During smelting, the compounds are subjected to decomposition in a fuel-rich reducing furnace at temperatures of about 800° to 1500° C. to produce metallic lead which is used in manufacturing new batteries.

Smelting consumes a great deal of energy because of the high temperatures involved. Also, furnace emissions pose significant pollution hazards resulting from volatile antimony and arsenic compounds from alloys and volatile lead and sulfate compounds. Controlling harmful emissions is costly, requiring considerable capital expenditure for equipment and operation. Although recovery of some chemicals (e.g., sodium sulphate) produced during "scrubbing" processes may offset some of the cost, smelting is still inefficient in terms of energy costs.

A number of methods are currently known for recycling battery components from expended batteries or from waste generated during battery manufacturing. For example, U.S. Pat. No. 4,024,055 teaches a process to reduce environmental contamination from waste in a lead-acid battery manufacturing operation by treating aqueous sulfuric acid waste water with an aqueous slurry of waste battery paste to neutralize the sulfuric acid component to a pH of about 5.5 to 8.5 and form a solid lead sulfate precipitate. U.S. Pat. No. 4,220,628 and U.S. Pat. No. 4,336,236 teach multistep desulfation methods to chemically convert lead sulfate in battery mud to pure lead oxide or basic lead carbonate and normal lead carbonate.

U.S. Pat. No. 4,769,116 teaches a method of battery recycling for the recovery of all the components in a pure enough state to be used in battery manufacturing. The method involves wet-screening to separate battery paste, desulfation of the paste by reacting it with sodium carbonate, leaching the lead carbonate with acid and reducing it with hydrogen peroxide, and thereafter recovering metal lead by electrolysis wherein lead is deposited on sheet-lead cathodes which can be smelted. U.S. Pat. No. 4,460,442 similarly teaches a method of recovering lead from battery paste which includes the steps of mixing battery paste with a strong alkaline solution at 100°–120° C. to obtain $Pb_3O_4$ which is precipitated and treated with an acid to produce a solution that is subjected to electrolysis to recover lead.

Lead-Acid Battery Manufacturing and Use

A lead-acid battery cell consists of lead-based electrical conductors submerged in sulfuric acid as is well known in the art. During discharging, ions flow in the acid to convert some of the lead dioxide to lead sulfate; during recharging, the current reverses and lead sulfate is converted to lead dioxide.

Because lead dioxide and sulfuric acid are relatively poor electrical conductors, a large surface area in contact with acid is required to produce sufficient current (e.g., for starting an automobile). The surface area is increased by providing a porous matrix of linked granules of lead dioxide on one grid and porous lead "sponge" on the other. Electrical currents flow from granule to granule in the porous matrix and ultimately reach the lead conductor.

Lead monoxide particles used in battery manufacturing generally have a diameter of less than about 200μ, and preferably have a mean size of about 3μ to about 15μ. Metallic lead in the particle, comprising about 3% to about 30% of the particle weight, enhances electrical conductivity and is advantageous in the electrochemical step of battery manufacturing.

Typically, the positive and negative plates are initially identical during lead-acid battery manufacturing, comprising a supporting grid structure cast from a fine grained, hard lead alloy filled with "battery paste." Battery paste is a doughy mixture of primarily lead monoxide granules mixed with dilute acid that is applied to grid structures in a lead acid battery to form the basic structure of the active plates. The physical properties of a mixture of particles suitable for forming battery paste include: a mean particle size as low as 2.9μ, an apparent density of 21–26 g/in$^3$, acid absorption of 170–200 mg/g. The chemical properties of particles suitable for battery paste are: 68–82% by weight lead monoxide, 18–32% free metallic lead, a maximum of 0.05% $Pb_3O_4$ and only traces of other elements.

Grids are coated with battery paste, dried to prevent plate adherence, and then cured in a high humidity environment. Curing produces a crystal structure of tribasic and tetrabasic lead sulfate that bonds the granules together. "Battery paste"

also sometimes is used to describe the rigid, frangible solid that results after curing of the plates. The cured battery paste has a void volume of about 50%, allowing penetration of the acid into the matrix and increasing the surface contact area.

After the battery is assembled, an electric current is passed through the cells causing an electrochemical conversion. Lead monoxide is converted to lead dioxide on the positive plates and to metallic "sponge lead" on the negative plates. The lead sulfate crystals that bind the granules together remain intact.

A lead-acid battery deteriorates during use because some of the lead sulfate fails to convert to lead dioxide during recharging. Bonds in the matrix also fail allowing the granules to detach and fall to the bottom of the acid reservoir forming a substance referred to as "breaker mud" or "battery mud." Most of the deterioration of the porous matrix likely occurs during the recharging process. The density of lead sulfate is about two-thirds that of lead dioxide. Thus, the physical changes that particles undergo in the matrix during recharging stress the weak lead sulfate crystal bonds.

"Battery mud" also refers to a mixture of lead compounds and metallic lead fragments that remain after shredding of whole lead acid batteries and the removal of light (primarily plastic) fragments and heavy fragments (primarily metallic lead posts and interconnectors). Battery mud principally contains lead dioxide and lead sulfate but small amounts of lead monoxide may also be present.

In an expended lead-acid battery, the battery paste present on the positive plate comprises a mixture of lead dioxide and lead sulfate. Lead dioxide, lead sulfate and other compounds may also be found in battery mud found at the bottom of a case in proportions that vary depending on the method of manufacturing and history of use of the battery (e.g., see U.S. Pat. No. 4,366,236). A high proportion lead sulfate in battery mud probably results from the chemical conversion of the matrix surface material to lead sulfate during discharging and detachment of the surface material from the plates during deterioration of the lead sulfate crystal bonds. The average composition adhering to the expended plates is about 59% lead dioxide and 41% lead sulfate.

Recycling the lead components of expended batteries currently involves high costs, particularly the energy costs associated with smelting. Thus, there is a need for methods to allow recovery of battery components in a form that can be used in manufacturing new batteries without requiring smelting. The methods of the present invention for recovering lead-containing components of battery paste provide for more direct recycling by bypassing some of the energy intensive steps in recycling and manufacturing of lead-acid batteries. The present invention avoids standard mechanical comminution of battery paste lumps (e.g., grinding or hammering) which can damage battery paste particles by chipping them, thus making them undesirable for direct use in battery manufacturing.

SUMMARY OF THE INVENTION

This invention relates to a battery recycling method that has the potential to extract existing lead components from the first stages of the recycling stream and reintroduce them in the middle of the manufacturing stream, thereby saving energy and processing costs and decreasing emissions of contaminants into the environment.

It is an object of the invention to eliminate steps in the recycling process in which lead sulfate and lead dioxide particles are converted to metallic lead. This is accomplished by recovering individual lead-containing particles from junk batteries and converting the lead sulfate particles to lead monoxide particles essentially identical to those produced by the conventional processes but without requiring smelting. Thus, it is an object of the invention to recover and purify particles from cured battery paste and battery mud so that the recovered particles can be used directly in the battery manufacturing process. It is another object of the invention to treat lead carbonate particles at temperatures of about 315° C. to convert them to lead monoxide particles for use in battery manufacturing.

According to one aspect of the invention, there is provided a method of separating lead containing particles from battery paste. The method includes the following steps: providing an aqueous slurry of used lead-acid battery paste material particles; breaking the lead containing particles in aggregates by impinging a flow of the slurry against a barrier to form an aqueous suspension of individual lead-containing particles; separating the lead containing particles from remaining battery paste material on the basis of particle size by directing said aqueous suspension in an upward flow of a solution having sufficient velocity that the lead containing particles are carried upward with said upward flow and other, larger particles are not carried upward; and collecting a portion of the lead containing particles that are carried upward with the flow. In a prefered embodiment, the method is carried out as a continuous flow basis. In another prefered embodiment, the breaking step comprises forcing the suspension of particles under pressure through an aperture into a chamber that has a substantially circular shape to cause the suspension of particles to flow in a circular motion around the perimeter of the chamber and contact a plurality of vanes projecting inwardly into the interior of the chamber to generate turbulence. In another prefered embodiment, the separating step includes directing an aqueous solution into a separation column at a predetermined rate of speed and at an angle relative to the flow of the suspension of particles to provide a substantially upward turbulence to the flow of the suspension of particles in circular motion. Preferably, the collecting step comprises extracting particles in the upper 30% of the separation column by removing a portion of the flowing suspension of particles from the upper 30% of the separation column at a predetermined rate of speed. In prefered embodiments, the upward turbulence is sufficient to lift particles having an specific gravity from about 1 g/cm$^3$ to about 12 g/cm$^3$, or about 3 g/cm$^3$ to about 6 g/cm$^3$, or about 3 g/cm$^3$ to about 9.4 g/cm$^3$ into the upper 50% of the separation column. In another prefered embodiment, the predetermined rate of speed at which the aqueous solution flows into the separation column to provide upward turbulence is substantially equal to a predetermined rate of speed at which a portion of the flowing suspension is removed from the separation column. The slurry can be at least about 10% to about 20% battery paste solids in an aqueous solution, preferably at least about 15% battery paste solids. In addition, the substantially aqueous solution of the slurry can contain at least about 0.5% by weight of sodium carbonate. In another embodiment of the method, impinging a flow of the slurry against a barrier produces sufficient hydrodynamic shear force to fragment crystal lead sulfate bonds in an aggregate of the particles. In other embodiments, the particles carried upward with the flow and collected are in a size range of about 1μ to about 1,000μ, or about 0.05μ to about 250μ, or about 0.5μ to about 50μ in the largest dimension, preferably about 1μ to about 20μ in the largest dimension. The method can include treating the particles collected with a solution containing sodium carbonate. Particles treated with sodium carbonate at any point in the method and collected can be heated to a temperature of about 315° C. to about 350° C., or about 315° C. to about 325° C., in air at ambient pressure with agitation. Prefereably, sodium carbonate treated and collected particles are heated to a temperature of about 315° C. to about 350° C. in air at ambient pressure with agitation until particles containing lead carbonate change in color from substantially white to substantially bright orange.

DETAILED DESCRIPTION OF THE INVENTION

The present invention is for a method of separating lead containing particles from battery paste. The method generally consists of the following sequence of steps to ultimately yield a mixture of powdered lead dioxide and lead monoxide that is suitable for use in battery paste for manufacturing of new batteries. The battery mud from spent batteries is subjected to turbulence driven comminution in a device that hydrodynamically separates metallic lead fragments from a slurry of lead dioxide and lead sulfate particles. The mixed slurry is then leached in a second pumped reactor to which a soda ash solution is added to produce a mixed slurry of lead dioxide and lead carbonate particles. Following washing and concentration of the lead dioxide and lead carbonate particles in the slurry using conventional methods, the damp cake of particles is heated to about 315° C. to about 350° C. using conventional methods such as in a rotary kiln to produce a mixed powder of lead dioxide and lead monoxide particles suitable to use in battery paste.

The invention is an improvement over current methods of battery recycling in which lead-containing components are generally smelted to produce metallic lead which must then be reconstructed mechanically and chemically into particles suitable for use in battery paste. The mixed lead dioxide/lead monoxide product, being essentially identical in particle size distribution to the lead monoxide material the manufacturer employs in the paste formulation, can be introduced directly into the lead-acid battery manufacturing process, thus eliminating energy intensive steps in the conventional process.

The method includes the steps of providing an aqueous slurry of used lead-acid battery paste material particles which can be obtained using standard methods well known in the art of dismantling lead-acid batteries. The battery paste residues are particles, and lumps of thousands of particles held together by the tribasic and tetrabasic lead sulfate crystal structures formed during paste curing with lead sulfates representing about 40% by weight of the mixed lead compounds.

Figure 1:
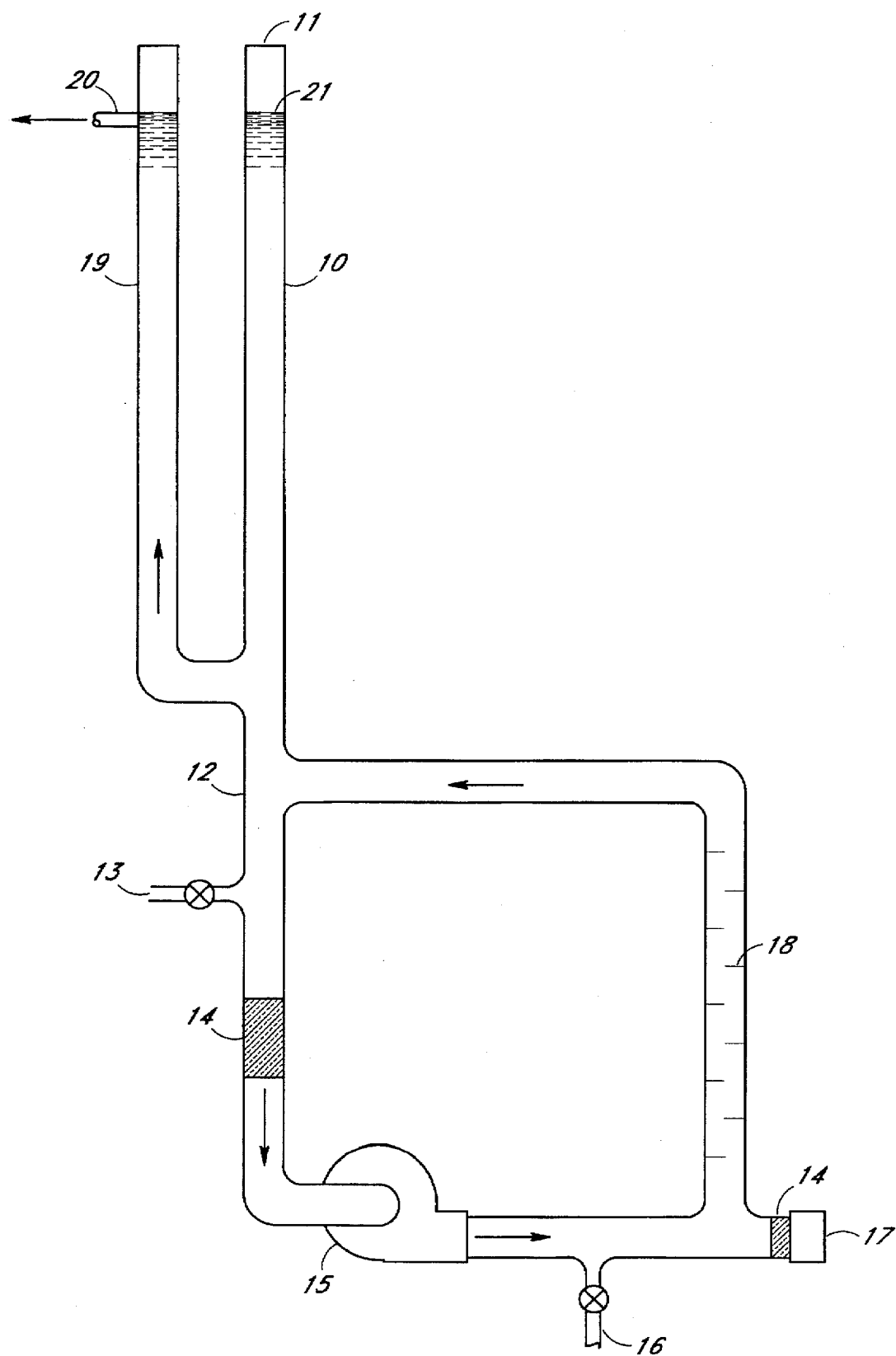
FIG. 1 is a diagram of one preferred embodiment of the hydrodynamic separator system for separation of lead-containing particles during recycling of battery paste components.

Referring to FIG. 1, the battery paste lumps and particles are fed into the charging column 10 of a separator system through an opening 11 in one end of the charging column.

The particles are fed into the charging column as an aqueous slurry or are mixed in the charging column with water to form a slurry that flows into the recirculating loop 12 of the separator system. Water enters the recirculating loop 12 through an inlet valve 13 in the separator system. The flow of slurry in the separator system can be visually monitored by viewing through transparent regions of the recirculating loop 12 referred to a sight glass regions 14. The flow of the slurry is controlled by a pump 15 which moves the slurry through the separator system in a unidirectional manner. A drain 16 is supplied at the lowest portion of the separator system for draining a portion of the slurry from the system, and particularly for draining the portion of the slurry in which larger, generally metallic, lead particles accumulate. An additional clean out port 17 is provided at the lowest portion of the separator distal from the pump 15 for removal of fragments of metallic lead that tend to collect in this region. The battery paste lumps circulating through the separator system are broken into smaller particles, preferably individual particles, by impinging the flow of the slurry against a plurality of vanes internal to at least one section of the device to serve as turbulence generators 18. As a result of breaking up the lumps, an aqueous suspension of individual battery paste particles is formed, including a substantial portion of lead sulfate particles.

The individual particles are then separated from the larger battery paste material on the basis of particle size by subjecting the aqueous slurry of particles to an upward flow of liquid that has sufficient velocity to carry individual lead-containing particles upward while larger particles continue to cycle around the separator system. The velocity of the upward flow required for separation of particles of a predetermined size range can be readily determined experimentally based on the theoretical settling velocities of mineral fragments in water as is well known in the art (e.g., see Chapter 5 of A. F. Taggart, *Elements of Ore Dressing*, pp. 70–71, John Wiley & Sons, Inc., 1951). The combination of particle size, weight and shape determine the rate of fall of the particles as determined for objects in free fall at terminal velocity. Thus, for particles of an average size, weight and shape, the uplift of the solution required to remove them from the flowing slurry can be calculated, using methods well known to those skilled in the art (A. F. Taggart, *Handbook of Mineral Dressing, Ores and Industrial Minerals*, Chapters 8 and 19, John Wiley & Sons, Inc. 1945).

Referring to FIG. 1, an aqueous solution enters the separator system from the inlet valve 13 at a predetermined rate to achieve the velocity of upward flow required to lift individual particles into the separation column 19 from which a slurry of the individual particles is removed via an outflow duct 20. The rate of liquid entering the system at the inlet valve 13 and the rate of slurry removal at the outflow duct 20 will determine the velocity of upward flow into the separation column 19 which can be calculated using methods well known in the art. The rates of liquid entering the system and slurry leaving the system are controlled based on the liquid level determined in the charging column 10 using a water level detector 21 by methods well known in the art. Alternatively, the liquid level can be maintained by providing for overflow through the outflow duct 20 which is of sufficient diameter to accommodate a volume equal to that supplied from the inlet valve 13. The system can be operated on a continuous flow basis.

Figure 2:
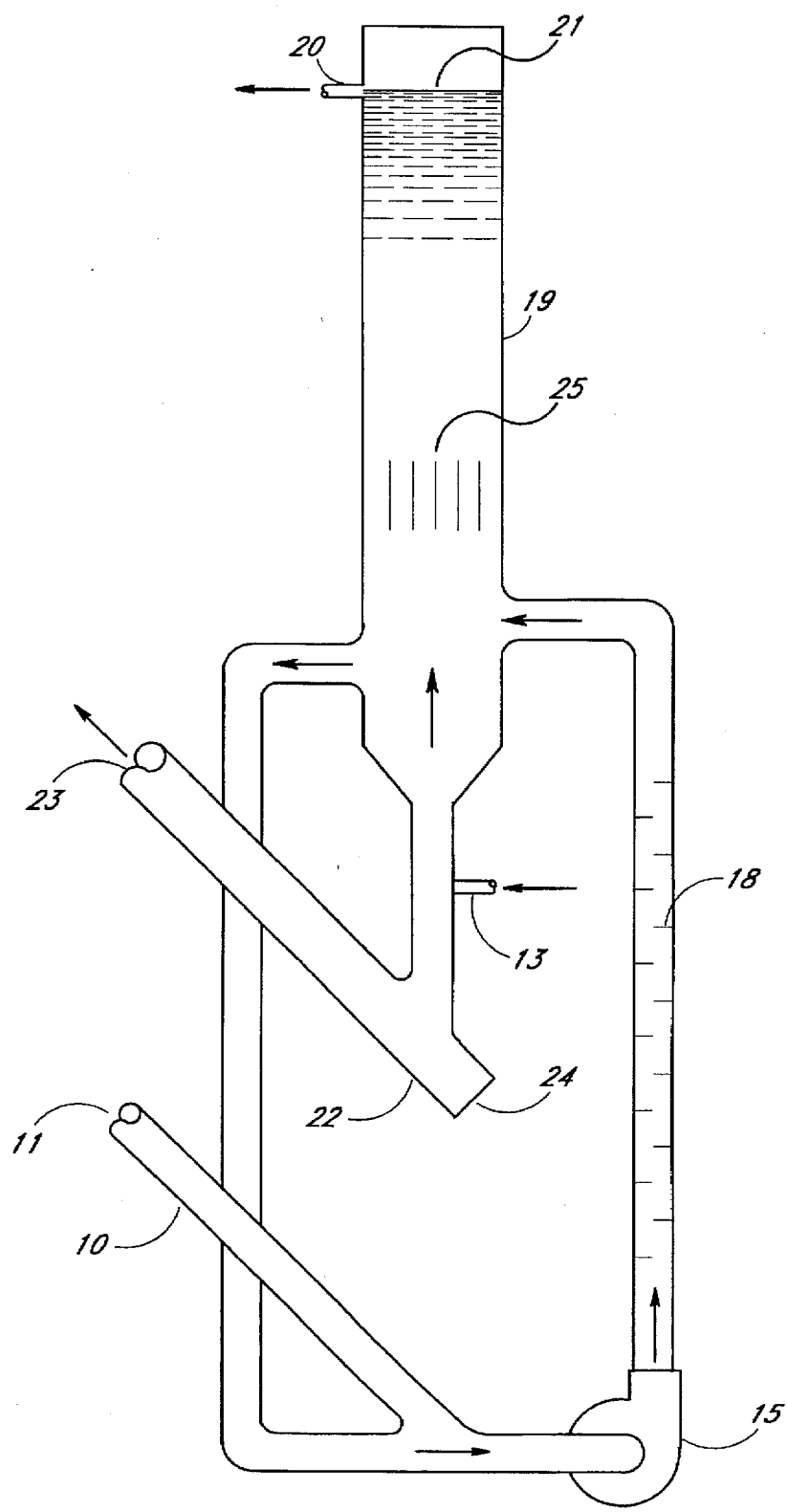
FIG. 2 is a diagram of another preferred embodiment of the hydrodynamic separator system for recycling of battery paste components that is particularly adapted for continuous flow processes.

One embodiment of the system that is designed for continuous flow operation is shown in FIG. 2. Referring to FIG. 2, the separator system provides a charging column 10 with an opening 11 for loading battery mud into the separator system as a slurry. The slurry is pumped through the separator system in a unidirectional manner using a pump 15 which forces the slurry against a plurality of internal vanes 18 that serve as turbulence generators. The turbulence generators may be vanes at any angle within the separator system and may be inclined to avoid accumulation of materials on a surface of the vane. The vanes may be movable or stationary and can be angled at alternating inclines to avoid a net swirl of the flow.

The slurry circulates through the separator system where it encounters an upwardly rising column of aqueous solution that enters the system via the inlet valve 13 and flows into the separation column 19. The velocity of the rising liquid is calculated to lift particles of a predetermined size range using methods well known in the art of mineral separation from ore. Metallic fragments fall out of the slurry into a primary separator 22 located at the base of the separation column 19 and below the level of the inlet valve 13. Metallic fragments can be automatically removed from the primary separator through an outflow port 23 by means well known in the art such as a conveyor system. Alternatively, metallic fragments can be removed from an opening 24 at the lower portion of the primary separator 22 and large or intermediate sized aggregate lumps of lead oxide/lead sulfate particles that fall into the primary separator 22 can be recycled into the system by connecting the outflow port 23 to the charging column 10. Optimally, by controlling the combination of port size, port location and slurry velocity, large and intermediate sized aggregates continue to circulate through the separating system and do not fall into the primary separator because their density is less than that of metallic lead because of the void volume of the aggregates. Particles that enter the separation column 19 via the rising water column may pass through a turbulence damper 25 located near the bottom end of the separation column 19.

This process does not separate particles on the basis of the specific gravity differences between lead sulfate and lead dioxide species per se. That basis of separation is ineffective in standard separation processes (as described in B. A. Wills, *Mineral Processing Technology*, 5th Ed., pp. 363–368, 1992; the relevant portions of which are hereby incorporated by reference) because the size variability of particles can subsume the differences in density of lead-containing particles (e.g., lead sulfate at 6.2 g/cm$^3$ and lead dioxide at 9.4 g/cm$^3$). Instead the system relies on upward lift of lead-containing particles in a column of aqueous solution such as water. The present method also avoids the disadvantage of introducing contaminants (e.g., oils) as occurs with flotation methods of particle separation.

The system includes breaking up battery paste lumps by forcing a slurry of battery paste under pressure through an aperture into a separator system that has a substantially circular shape. This force causes the slurry of battery paste particles to flow in a circular motion around the perimeter of the chamber where they contact turbulence generators and are broken into smaller lumps or individual particles. In contrast, metallic lead fragments are not broken by the turbulence and instead fall out of the slurry.

The method includes separating lead-containing particles from the slurry which also contains metallic lead fragments by directing an aqueous solution into the separation column at a predetermined rate of speed and at an angle relative to the flow of the suspension of particles to provide a substantially upward lift to the particles in the slurry which is flowing in a circular motion. The upward lift is sufficient to lift lead sulfate, lead dioxide and lead monoxide particles ranging in size from about 0.05μ to about 250μ, preferably from about 1μ to about 50μ, and most preferably from about 2μ to about 15μ, into at least the upper half of the separation column. The collecting step of the method includes extracting particles in the upper 50% of the separation column by removing a portion of the flowing suspension of particles from the upper 50% of the separation column at a predetermined rate of speed. Extraction can be from essentially the upper level of the solution to about half-way down the separation column. Because individual lead-containing particles are preferentially concentrated in the upper half of the separation column, extraction of the upper 30% of the suspension, preferably through an aperture located in the upper 30% of the separation column, effectively collects a subset of lead-containing particles of a predetermined size range from all the particles present in the separation column.

The separating and collecting steps are preferably coordinated so that the predetermined rate of speed at which the aqueous solution flows into the separation column to provide upward lift is substantially equal to a predetermined rate at which a portion of the suspension is removed from the separation column. The coordination of these two rates can be monitored by determining the water level in the charging chamber 10 or the separation column 19 by means of a water level detector 21 using any of a variety of methods well known in the art. The separated lead sulfate and lead dioxide particles are then converted into a mixture of lead oxides (monoxides and dioxides).

The mixture of particles collected from about the upper 30% of the separation column are treated with a solution containing sodium carbonate to change lead sulfate particles to lead carbonate particles. This involves chemical steps well known in the art, performed in a pumped flow reactor as diagramed in FIG. 3. This apparatus comprises an inlet 26 for receiving the particle slurry from the column separator and a separate inlet 27 for receiving a sodium carbonate solution. The mixture of slurry and sodium carbonate circulates through the pumped flow reactor in a unidirectional flow by means of a pump 15. The reactor has an outlet 29 for withdrawing a portion of the mixture into a concentrator 30 such as a conventional centrifugal separator which concentrates the reacted slurry into a paste or cake that can be removed via an outlet from the concentrator 31. The concentrator has a separate outlet for removal of spent solution 32.

Because both lead dioxide and lead carbonate can be decomposed at relatively modest temperatures (see *Lang's Handbook of Chemistry*, 3rd Ed., 1939; the relevant portions of which are hereby incorporated by reference), the lead-containing particles purified by the method of the present invention are treated with heat to decompose the lead dioxide or lead carbonate into lead monoxide. Lead dioxide decomposes to lead monoxide at 290° C. and lead carbonate decomposes to lead monoxide at 315° C. (see *Lang's Handbook of Chemistry*, 3rd Ed., 1939).

The particles in the paste or cake are heated to a temperature of about 315° C. to about 350° C., preferably from about 315° C. to about 325° C., in air at ambient pressure until the particles change in color from substantially white to substantially bright orange indicating the conversion of lead carbonate a substantially pure composition of lead monoxide particles.

Although the published decomposition temperatures of lead dioxide to lead monoxide and lead carbonate to lead monoxide (290° C. and 315° C., respectively) are relatively close in range, the decomposition processes do not proceed at the same rate. Surprisingly, when lead dioxide and lead carbonate particles are exposed to a heated surface at about 315° C. to about 350° C. the lead carbonate particles (white colored) are completely converted to lead monoxide (bright orange colored) before the lead dioxide (brown colored) particles begin to change, as evidenced by color changes.

The mixture of lead monoxide and lead dioxide particles can be further mixed with additional lead monoxide or lead dioxide particles to form a battery paste containing a blend of component ratios different from that obtained from the recycled battery paste. Such mixtures are suitable for forming a battery paste with enhanced electrical conductivity when applied on the plates, thus requiring less energy to convert the lead monoxide to lead dioxide. Heat conversion of lead carbonate particles to lead monoxide particles using the method of the present invention yields a mixture of particles that may be used directly in forming battery paste for new battery manufacturing without smelting.

In the present invention, the aggregate lumps and fragments are charged into a hydrodynamic system comprising a recirculating reservoir, which discharges the smaller particles by hydrodynamic lift against gravity. Smaller lumps are carried into a jet impinging against several vanes in a cascade, which fragment the aggregate into individual particles by fluid shear in the boundary layers. Individual particles are removed from this continuously recirculating flow by a secondary gravity lift system, at velocities sufficient to lift only single particles. It is clear that where gravity is employed in this process, it can be enhanced or replaced by centrifugal forces.

If desired, the hydrodynamic separation system may be combined simultaneously with a leaching process wherein soda ash is added in an aqueous solution to the separator system to convert the lead sulfates to lead carbonates. The tribasic lead sulfate crystals are converted into carbonates, thus significantly degrading the crystalline bond strength and enhancing comminution of the lumps to increase recovery of individual particles. Alternatively, leaching can be done after the particles leave the hydrodynamic comminution system and enter the pump flow reactor (see FIG. 3).

The relevant portions of all the patents and publications cited herein are incorporated by reference.

The general principles of the present invention may be more fully appreciated by reference to the following non-limiting examples.

EXAMPLE 1

Separation of Lead-containing Particles from Battery Mud

Battery mud comprising lumps, lead-containing particles and metallic lead fragments separated to a maximum of about 1 cm in the largest dimension was loaded as an aqueous slurry into the charging column of a device as shown in FIG. 1. All portions of the system, including the charging column, the circulating flow separator system and the separation column had an internal diameter of about 44.5 mm. The length of the flow path in the separator system loop equaled about 3.9 meters. The system was initially full of water and the pump was running. The total water content of the system was about 9 liters. About 1 kg of the wet, screened material was poured into the system over about a 30 second period to avoid plugging the separator system loop. The total volume of the pumped separator system loop was about 6 liters, so the solids in the separator equaled about 15% of the volume. Maximum loading by weight of a rising water column in which the particles did not interfere with each other was about 15%. The upwelling velocity in the separator column was set at a rate of about 0.1 mm/sec before the slurry was added to the system. This rate was sufficient to entrain particles of about 3µ or less in the major dimension. Water entered the water inlet of the separator system at a rate about 9 cc/min, sufficient to replace the liquid removed from the system via the outflow port. The slurry moved through the separator system loop assisted by the pump at a flow rate of about 1.7 liters/sec, providing a superficial velocity in the separator system of about 1.1 meters/sec.

Turbulence generators were present in one section of the circulating flow separator system. The turbulence generators were eight vanes projecting into the inner chamber at approximately a 90° angle relative to the side of the separator system wall and extending about half-way into the inner diameter of the separator system. The eight vanes were placed at intervals of about 1.5 times the inner diameter of the separator system. After 20 minutes, equaling about 340 complete cycles of movement through the separator system (about one complete circuit every 3.5 sec), comminution of the battery paste particles was complete. During the entire 20 minute period, particulate material in the separator column was removed via the outflow port at a rate approximately equal to that of the rate of water inflow into the system.

Using a similarly charged system, higher rising flow velocities were also employed, ranging up to about 2 mm/sec (requiring an inlet flow of water of about 180 cc/min) which was sufficient to lift particles having a maximum dimension of about 15µ.

The actual diameters of the various components of the system could have varied while still being effective at particle separation. For example, an effective separation column could have been as much as 4–10 times larger in diameter and still been effective at particle separation. With larger diameter tubes making up the device, the feed rates of slurry into the system could be proportionately increased if the flow rate within the loop of the separator system were maintained. For example, if the inner diameter of the system were doubled, four times the circulating flow would be required to maintain effective comminution.

In addition, the same degree of comminution could be obtained using fewer circuits of flow around the separator system loop if additional turbulence generators were employed. That is, if the turbulence generators were increased to 50, then only about 55 circuits around the separator system loop during approximate three minutes of total flow time would be required for the same degree of comminution. The pumping capacity would have to be increased commensurately to maintain the same flow rate with the addition of more turbulence generators.

EXAMPLE 2

Sodium Carbonate Leaching of Recovery Battery Mud Particles

The slurry of separated particles obtained as in Example 1, was leached by agitating a suspension comprising about 5 to 20% lead compounds by weight in particles of about 0.05µ to about 10µ in diameter in a sodium carbonate solution of about 0.5% to about 7% by weight. In small batches, agitation was accomplished by use of a magnetic stirrer in a beaker or use of a laboratory blender for about 5 to 20 minutes at room temperature. Any of a variety of well known methods of agitation could be used effectively for mixing larger volumes, including paddle mixing, air-lift mixing and the like. After about 15 minutes, there was substantially complete conversion of lead sulfate particles into lead carbonate particles as detected by thermal decomposition conversion to lead monoxide and microscopic examination of particles for the characteristic colors of lead carbonate (white) and lead monoxide (bright orange).

EXAMPLE 3

Heat Conversion of Lead Carbonate Particles to Lead Monoxide Particles

After concentration of the lead carbonate and lead dioxide particles from a slurry produced according to the methods of Example 2, the damp cake of particles was applied in a thin layer (about 1–10 mm thick) to a solid surface heated to about 315°–350° C. The particles were agitated on the surface using mechanical means to facilitate contacting essentially all particles with the heated surface and heat the particles to about 315° C. for about 10–30 minutes. After about 1 minute, conversion of lead carbonate into lead monoxide was observed based on the color change of particles from white to bright orange. After about 20 minutes, conversion of the lead carbonate particles into lead monoxide particles was essentially complete based on the observed color change. Lead dioxide particles (brown in color) in a mixture of lead carbonate particles remained essentially unchanged during about 20 minutes of heating so that the final mixture was a mixture of lead monoxide particle and lead dioxide particles (individual particles were identified on the basis of their distinctive color when observed using microscopy).

At surface temperatures above 350° C. or if agitation of the particles ceased during heating, thus allowing particles directly on the surface to remain at temperatures of 350° C. for more than about 15 minutes, the lead dioxide particles were converted to lead monoxide particles as evidenced by the color change (brown to bright orange) in the particles when examined under a microscope.

Scale up of this heating process could be easily accomplished by using an externally heated rotary kiln, vibrating screen in an oven, or similar conventional heating machinery that permits rapid agitation of particles.

EXAMPLE 4

Continuous Flow Separation of Lead-containing Particles from Battery Mud

Using a device such as that diagramed in FIG. 2, battery mud separated by conventional battery crushing methods is fed into the charging column of at least 44 mm in diameter in a slurry comprising about 15% solids and 85% aqueous solution at a rate of about 1.7 l/sec. The slurry can be made using water, a sodium carbonate solution to simultaneously leach the lead-containing components, or other aqueous solutions such as basic solutions to neutralize the acids in the battery mud, as is well known in the art.

The slurry is pumped through the circulating flow separator system of at least 4 meters in length at a rate of about 1 to 3 l/sec so that solids in the slurry contact a series of about 5–50 turbulence generator vanes in the separator system at least once before the slurry is passed over a uplifting column of an aqueous solution. Preferably, the slurry passes through the separator system on a mass average of about one to 300 times before being exposed to the uplifting column of liquid, preferably water. After the slurry has passed through the circular flow separator system at least once, it passes through a region where it is exposed to the uplifting column of liquid of sufficient velocity to lift lead sulfate, lead dioxide and lead monoxide particles (or particles representing a mixture of the compounds) of about 0.05μ to 250μ in greatest dimension into the separation column. Preferably the uplifting column of liquid separates fragments of 0.05μ to about 50μ, and most preferably separates fragments of 0.05μ to about 15μ. The velocity of the uplifting column effective for separating such particles can be readily calculated using methods well known in the art of ore separation. In substantially the same area, metallic lead fragments fall by gravity into the primary separator where they are conveyed out of the system to be collected by any of a variety of methods well known in the art. The metallic lead fragments can be removed periodically or continuously.

Particles in the uplifting column of liquid enter a separation column which may include one or a series of turbulence dampers. If the upward flow of particles involves sufficient turbulence to maintain particles of a particular size in suspension, then the sections of the separation column between a series of turbulence dampers may serve to separate particles into different size classes based on the level of turbulence in each area which is sufficient to hold particles of a particular size class in suspension. It will be appreciated that individual outlet ports corresponding to each area between turbulence dampers in a series would be used to siphon off the particular size class of particles held in suspension in that area.

Particles of about 0.05μ to about 250μ in greatest dimension, or 0.05μ to about 50μ, or preferably 0.05μ to about 15μ, are removed from the separation column by continuous flow out of the outlet located in the upper half of the separation column, preferably in the upper 10% of the separation column. The outflow can be accomplished by pumping out a volume of slurry of about 0.1–10 l/hr or by allowing a volume equivalent to that of the inflowing slurry to exit the outlet port by simple overflow and gravity. The amount of slurry present in the separation column is monitored continuously by use of a water level detector in the separation column as is well known in the art.

Separated particles may be converted into lead carbonate by conventional leaching methods or by immediately conveying the slurry of separated particles into a pumped flow reactor.

EXAMPLE 5

Conversion of Lead Sulfate Particles Into Lead Carbonate in a Pumped Flow Reactor.

Figure 3:
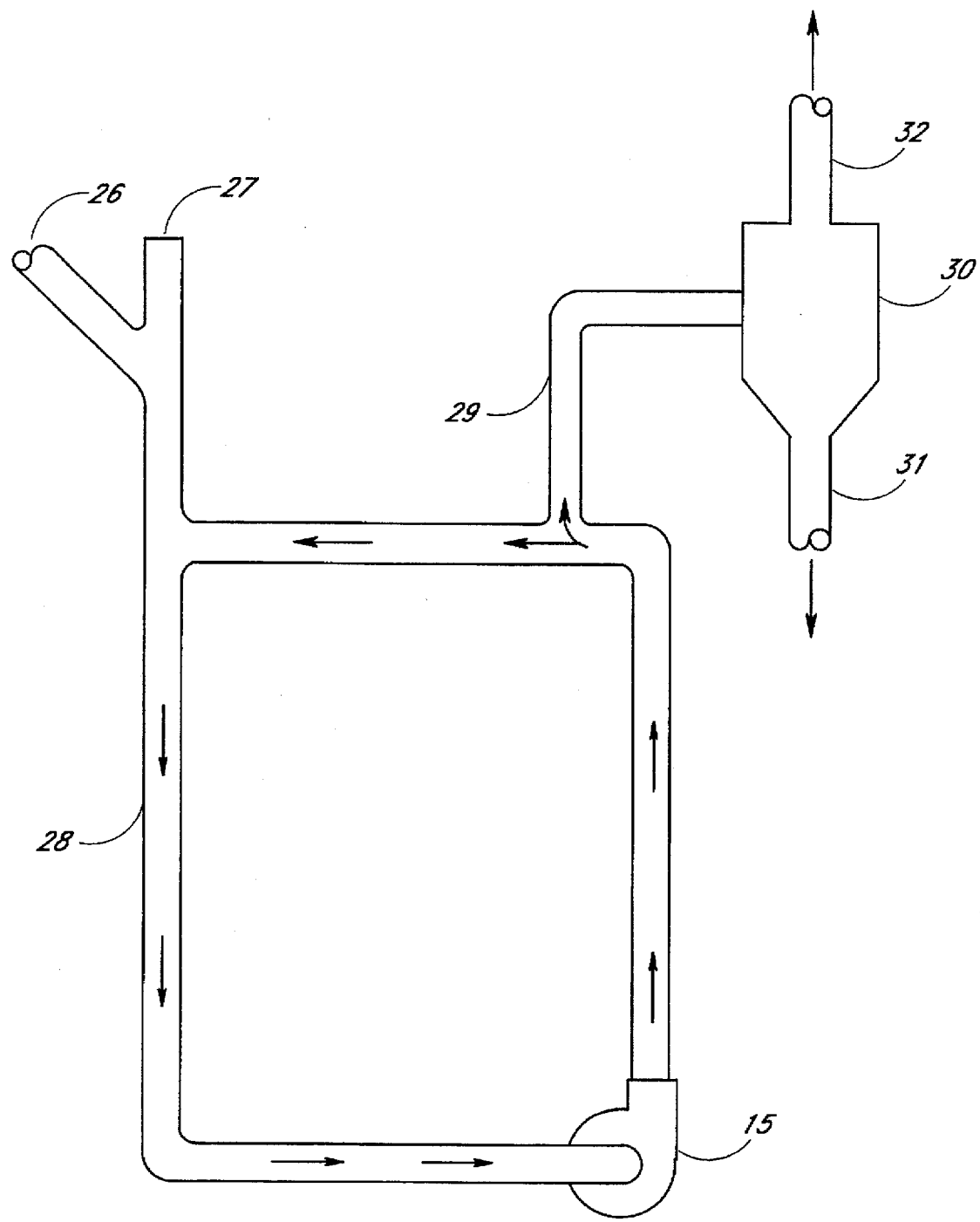
FIG. 3 is a diagram of a pumped flow reactor for leaching a mixture of lead dioxide and lead sulfate particles recovered from the hydrodynamic separator system of either FIG. 1 or FIG. 2.

A mixture of lead sulfate, lead dioxide and lead monoxide particle of about 0.05μ to 250μ in greatest dimension in a slurry of about 5–15% solids and 85–95% aqueous solution is forced into the inlet of a pumped flow reactor as diagramed in FIG. 3 at a rate of about 0.1–10 l/hr. The charging column has an inner diameter of about 44 mm or more as does the circulating loop; the circulating loop comprises about 2–20 meter total length and may comprise a plurality of contiguous loops to occupy a more limited space. Simultaneously, a saturated solution of sodium carbonate (28.1 g/100 ml) or solid sodium carbonate (hydrated or anhydrous) is added via a separate inlet into the pumped flow reactor at a rate sufficient to achieve a final concentration of sodium carbonate of about 0.5% to about 7% in the slurry.

The slurry of particles in sodium carbonate is mixed by pumping the slurry through the pumped flow reactor at a rate of about 0.1–150 l/hr in a unidirectional manner. A volume of the slurry is continuously removed from reactor at a rate of about 0.1–150 l/hr and the particles in the slurry are concentrated by conventional means including filtration, centrifugation or gravitational settling. The spent solution is removed and the resulting damp cake of particles are heated to convert the lead carbonate particles to lead monoxide as described in Example 3.

While particular embodiments of the invention have been described in detail, it will be apparent to those skilled in th art that these embodiments are exemplary rather than limiting, and the true scope of the invention is defined by the claims that follow.

I claim:

1. A method of separating lead containing particles from battery paste, comprising the steps of:

providing an aqueous slurry of used lead-acid battery paste material particles comprising aggregates of metallic lead-containing particles, wherein at least some of the aggregates include crystal lead sulfate bonds between metallic lead-containing particles;

breaking said battery paste material particles by impinging a flow of said slurry against a barrier to form an aqueous suspension of metallic lead-containing particles;

separating a portion of the metallic lead-containing particles from said battery paste material particles on the basis of particle size by directing said aqueous suspension in an upward flow of a solution having sufficient velocity that said metallic lead-containing particles are carried upward with said upward flow and battery paste material particles larger than said metallic lead-containing particles are not carried upward; and collecting a portion of said metallic lead-containing particles that are carried upward with said flow.

2. The method of claim 1 wherein the method is carried out as a continuous flow basis.

3. The method of claim 1, wherein the breaking step comprises forcing said aqueous suspension under pressure through an aperture into a chamber that has a substantially circular shape to cause said aqueous suspension to flow in a circular motion around the perimeter of said chamber and contact a plurality of vanes projecting inwardly into the interior of the chamber.

4. The method of claim 1, wherein the separating step comprises directing an aqueous solution into a separation column at a rate of speed sufficient to cause turbulence in the upward flow and at an angle relative to the upward flow of the suspension of metallic lead-containing particles to provide a substantially upward turbulence to the upward flow of the suspension of metallic lead-containing particles.

5. The method of claim 4, wherein the collecting step comprises extracting metallic lead-containing particles in the upper 30% of the separation column by removing a portion of the aqueous suspension of the metallic lead-containing particles from the upper 30% of the separation column.

6. The method of claim 4, wherein the upward turbulence is sufficient to lift metallic lead-containing particles having an specific gravity from about 1 g/cm$^3$ to about 12 g/cm$^3$ into the upper 50% of the separation column.

7. The method of claim 4, wherein the upward turbulence is sufficient to lift metallic lead-containing particles having an specific gravity from about 3 g/cm$^3$ to about 6 g/cm$^3$ into the upper 50% of the separation column.

8. The method of claim 4, wherein the upward turbulence is sufficient to lift metallic lead-containing particles having an specific gravity from about 3 g/cm$^3$ to about 9.4 g/cm$^3$ into the upper 50% of the separation column.

9. The method of claim 4, wherein the rate of speed sufficient to cause turbulence in the upward flow at which the aqueous solution is directed into the separation column to provide upward turbulence is substantially equal to a rate of speed at which a portion of the suspension of metallic lead-containing particles is removed from the separation column.

10. The method of claim 1, wherein the slurry comprises at least about 10% to about 20% battery paste solids in an aqueous solution.

11. The method of claim 10, wherein the slurry comprises at least about 15% battery paste solids in an aqueous solution.

12. The method of claim 1, wherein the substantially aqueous solution of the slurry contains at least about 0.5% by weight of sodium carbonate.

13. The method of claim 1, wherein impinging a flow of said slurry against a barrier produces sufficient hydrodynamic shear force to fragment crystal lead sulfate bonds in an aggregate of said metallic lead-containing particles.

14. The method of claim 1, wherein the metallic lead-containing particles that are carried upward with said upward flow and collected in the collecting step are in a size range of about 1μ to about 1,000μ in the largest dimension.

15. The method of claim 1, wherein the metallic lead-containing particles that are carried upward with said upward flow and collected in the collecting step are in a size range of about 0.05μ to about 250μ in the largest dimension.

16. The method of claim 1, wherein the metallic lead-containing particles that are carried upward with said upward flow and collected in the collecting step are in a size range of about 0.5μ to about 50μ in the largest dimension.

17. The method of claim 1, wherein the metallic lead-containing particles that are carried upward with said upward flow and collected in the collecting step are in a size range of about 1μ to about 20μ in the largest dimension.

18. The method of claim 1, further comprising treating the metallic lead-containing particles obtained in the collecting step with a solution containing sodium carbonate.

19. The method of claim 12 or claim 18, further comprising heating the metallic lead-containing particles obtained in the collecting step to a temperature of about 315° C. to about 350° C. in air at ambient pressure with agitation.

20. The method of claim 12 or claim 18, further comprising heating the metallic lead-containing particles obtained in the collecting step to a temperature of about 315° C. to about 325° C. in air at ambient pressure with agitation.

21. The method of claim 12 or claim 18, further comprising heating the metallic lead-containing particles obtained in the collecting step to a temperature of about 315° C. to about 350° C. in air at ambient pressure with agitation until metallic lead-containing particles that also contain lead carbonate change in color from a substantially white color to a substantially bright orange color.

\* \* \* \* \*